United States Patent
Mardani et al.

(10) Patent No.: US 8,644,436 B2
(45) Date of Patent: Feb. 4, 2014

(54) METHOD AND APPARATUS FOR ENHANCED UPLINK GENERAL RAKE CHANNEL ESTIMATION

(75) Inventors: Reza Mardani, Greensboro, NC (US); Gurudutt Hosangadi, Hackettstown, NJ (US); Patrice Saintot, Trelevern (FR)

(73) Assignee: Alcatel Lucent, Paris (FR)

( * ) Notice: Subject to any disclaimer, the term of this patent is extended or adjusted under 35 U.S.C. 154(b) by 35 days.

(21) Appl. No.: 13/399,457

(22) Filed: Feb. 17, 2012

(65) Prior Publication Data

US 2013/0216011 A1 Aug. 22, 2013

(51) Int. Cl.
*H04B 14/06* (2006.01)
(52) U.S. Cl.
USPC .......................................................... 375/347
(58) Field of Classification Search
USPC ......... 375/347, 130, 148, 224, 316, 340, 249; 370/252; 455/456.6, 509
See application file for complete search history.

(56) References Cited

U.S. PATENT DOCUMENTS

| | | | | |
|---|---|---|---|---|
| 6,700,919 B1* | 3/2004 | Papasakellariou | ............ | 375/130 |
| 6,850,505 B1 | 2/2005 | Ostberg | | |
| 7,894,514 B2 | 2/2011 | Dominique et al. | | |
| 2007/0297494 A1* | 12/2007 | Lindoff | ......................... | 375/148 |
| 2011/0206167 A1* | 8/2011 | Rosenqvist et al. | .......... | 375/346 |

FOREIGN PATENT DOCUMENTS

| | | |
|---|---|---|
| EP | 1107524 A2 | 6/2001 |
| WO | WO-0229978 A2 | 4/2002 |

OTHER PUBLICATIONS

International Search Report dated Mar. 14, 2013 for related International Application No. PCT/US2013/024690.
Bottomley, G., et al., "A Generalized RAKE Receiver for Interference Suppression," IEEE Journal on Selected Areas in Communications, vol. 18, No. 8, pp. 1536-1545, Aug. 8, 2000.
Mailaender, Laurence, "G-Rake Finger Placement in Time and Frequency Domains," IEEE, 2009.
Khayrallah, A., et al., "Fast Finger Selection for GRAKE," IEEE, 2005.
Wang, Fanggang, "Adaptive Fingers Selection of Grake Receivers in MIMO-HSDPA," IEEE, 2008.
Digital Communications, John G. Proakis, $3^{rd}$ edition, ISBN 0-07-051726-6 WCB/McGraw Hill (section 14, pp. 795-798).

\* cited by examiner

*Primary Examiner* — Khai Tran
(74) *Attorney, Agent, or Firm* — Harness, Dickey & Pierce

(57) ABSTRACT

In one embodiment, an apparatus for channel estimation includes a first receiver configured to obtain a first channel estimate associated with a communication channel between the apparatus and a user equipment. The apparatus also includes a second receiver. The second receiver includes a channel estimation unit and a normal receiver processing unit. The channel estimation unit is configured to compute a second channel estimate of channel conditions associated with the communication channel. The normal receiver processing unit is configured to compute weights using the second channel estimation unit. The channel estimation unit is further configured to obtain a delay between the obtaining of the first channel estimate and the computing of the weights, and to compute the second channel estimate using the delay and the first channel estimate.

14 Claims, 4 Drawing Sheets

METHOD AND APPARATUS FOR ENHANCED UPLINK GENERAL RAKE CHANNEL ESTIMATION

BACKGROUND

Wireless communication systems typically include a plurality of base stations strategically located to provide wireless communication coverage over a selected area or region. Each base station typically serves a cell that includes a plurality of sectors.

Specially-designed data packets are required to achieve low-latency internet-type data communications. Systems that allow for data communications often include a scheduled uplink channel that is shared among various users. Different users will have different channel conditions depending on the location of the mobile station, a velocity of the mobile station and other known factors. Accordingly, different users will have different burst rates on the scheduled uplink.

Typical systems for processing data signals transmitted on an uplink communication channel and received at a base station include a rake receiver. As is known, a general rake receiver includes a technique that uses several baseband correlators to individually process several signal multipath components. The correlator outputs are combined to achieve improved communication, reliability and performance.

However, rake receivers have certain limitations. For example, rake receivers generate weighted coefficients to be correlated with a signal destined for a user equipment on the uplink or downlink communication channel. Conventional rake receivers determine such weights based on available channel estimates. However, these channel estimates may be delayed due to the timing relationship between a base station and a user equipment. Furthermore, the channel undergoes a Doppler effect, which causes further distortion of these estimates. Such limitations may contribute to degradation of the performance of the wireless system.

SUMMARY

Embodiments provide a method and/or apparatus for channel estimation.

In one embodiment, an apparatus for channel estimation includes a first receiver configured to obtain a first channel estimate associated with a communication channel between the apparatus and a user equipment. The apparatus also a second receiver. The second receiver includes a channel estimation unit and a normal receiver processing unit. The channel estimation unit is configured to compute a second channel estimate of channel conditions associated with the communication channel. The normal receiver processing unit is configured to compute weights using the second channel estimation unit. The channel estimation unit is further configured to obtain a delay between the obtaining of the first channel estimate and the computing of the weights, and to compute the second channel estimate using the delay and the first channel estimate.

In one embodiment, the first receiver is a RAKE receiver and the second receiver is a general-RAKE receiver.

In one embodiment, the first receiver is configured to obtain a Doppler estimate, and the channel estimation unit is configured to compute the second channel estimate using the delay, the first channel estimate, and the Doppler estimate.

In one embodiment, the first receiver and the second receiver each include a number of sub-receivers, and the first and second receivers obtain sub-receiver information indicating positional information of the sub-receivers. In one embodiment, the channel estimation unit is configured to compute the second channel estimated based on the delay, the first channel estimate, the Doppler estimate, and the sub-receiver information.

In one embodiment, the channel estimation unit determines whether Doppler estimates are available from the first receiver. The channel estimation unit generates a correlation matrix based on the Doppler estimates if the Doppler estimates are available from the first receiver, and the channel estimation unit computes the second channel estimate using the correlation matrix.

In one embodiment, the channel estimation unit generates a sample correlation matrix if the Doppler estimates are not available from the first receiver. The channel estimation unit computes the second channel estimate using the correlation matrix.

In one embodiment, the channel estimation unit computes coefficients using the correlation matrix or the sample correlation matrix, and the channel estimation unit computes the second channel estimate based on the computed coefficients and the first channel estimate.

In one embodiment, the method for channel estimation includes obtaining, by a first receiver, a first channel estimate associated with a communication channel between a base station and a user equipment. The method further includes computing, by a second receiver, a second channel estimate associated with the communication channel. The method further includes obtaining, by the second receiver, a delay between when the first channel estimate was obtained by the first receiver and when weights are computed by the second receiver.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Figure 1:
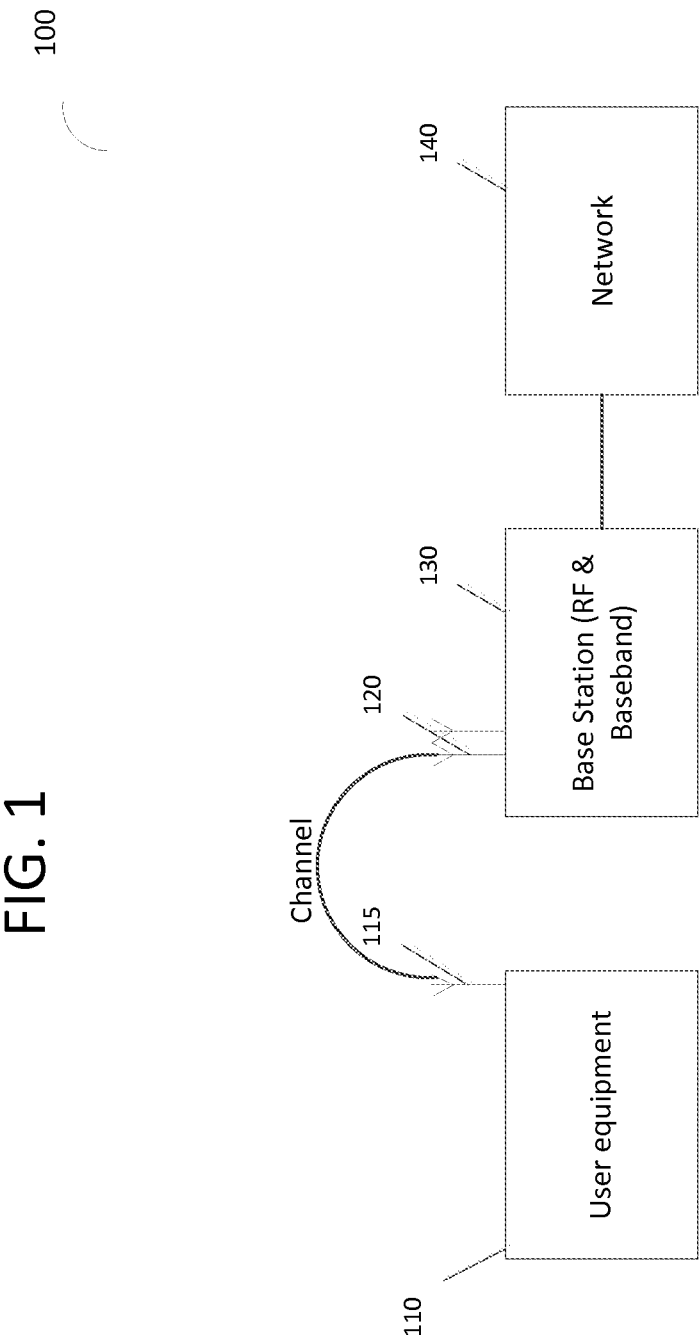
FIG. 1 illustrates a wireless system according to an embodiment.

Various example embodiments will now be described more fully with reference to the accompanying drawings in which some example embodiments are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes that include routines, programs, objects, components, data structures, etc., that when executed perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like machines that once programmed become particular machines.

It should be borne in mind, however, that all of these and similar terms are to be associated with the appropriate physical quantities and are merely convenient labels applied to these quantities. Unless specifically stated otherwise, or as is apparent from the discussion, terms such as "obtaining", "computing", "determining", or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices. Such functions are performed by one or more processors.

As used herein, the term "user equipment" may be considered synonymous to, and may hereafter be occasionally referred to, as a terminal, mobile unit, mobile station, mobile user, subscriber, user, remote station, access terminal, receiver, etc., and may describe a remote user of wireless resources in a wireless communication network.

The term base station (BS) may be considered synonymous to and/or referred to as a base transceiver station (BTS), NodeB, extended Node B (eNB), femto cell, access point, etc. and may describe equipment that provides the radio baseband functions for data and/or voice connectivity between a network and one or more users.

FIG. 1 illustrates a wireless system 100 according to an embodiment.

The wireless system 100 includes one or more user equipments 110, and a base station 130 that is connected to a network 140. The network 140 may be considered the core network and includes one or more gateways for routing information to other components connected to the network 140. The network 140 may perform other known functions associated with a core network. Also, because the components of the network 140 are well known, the details of the network 140 are omitted for the sake of brevity.

The user equipment 110 includes an antenna 115 for the reception and transmission of signals from and to the base station 130. Although one antenna is shown in FIG. 1, the embodiments encompass any number of antennas. Similarly, the base station 130 includes one or more antennas 120 for the reception and transmission of signals from and to the user equipment 110 and/or the network 140. These signals are transmitted over one or more air interfaces. Techniques for establishing and maintaining the air interfaces between the user equipment 110 and the base station 130 or the base station 130 and the network 140 are well known.

Figure 2:
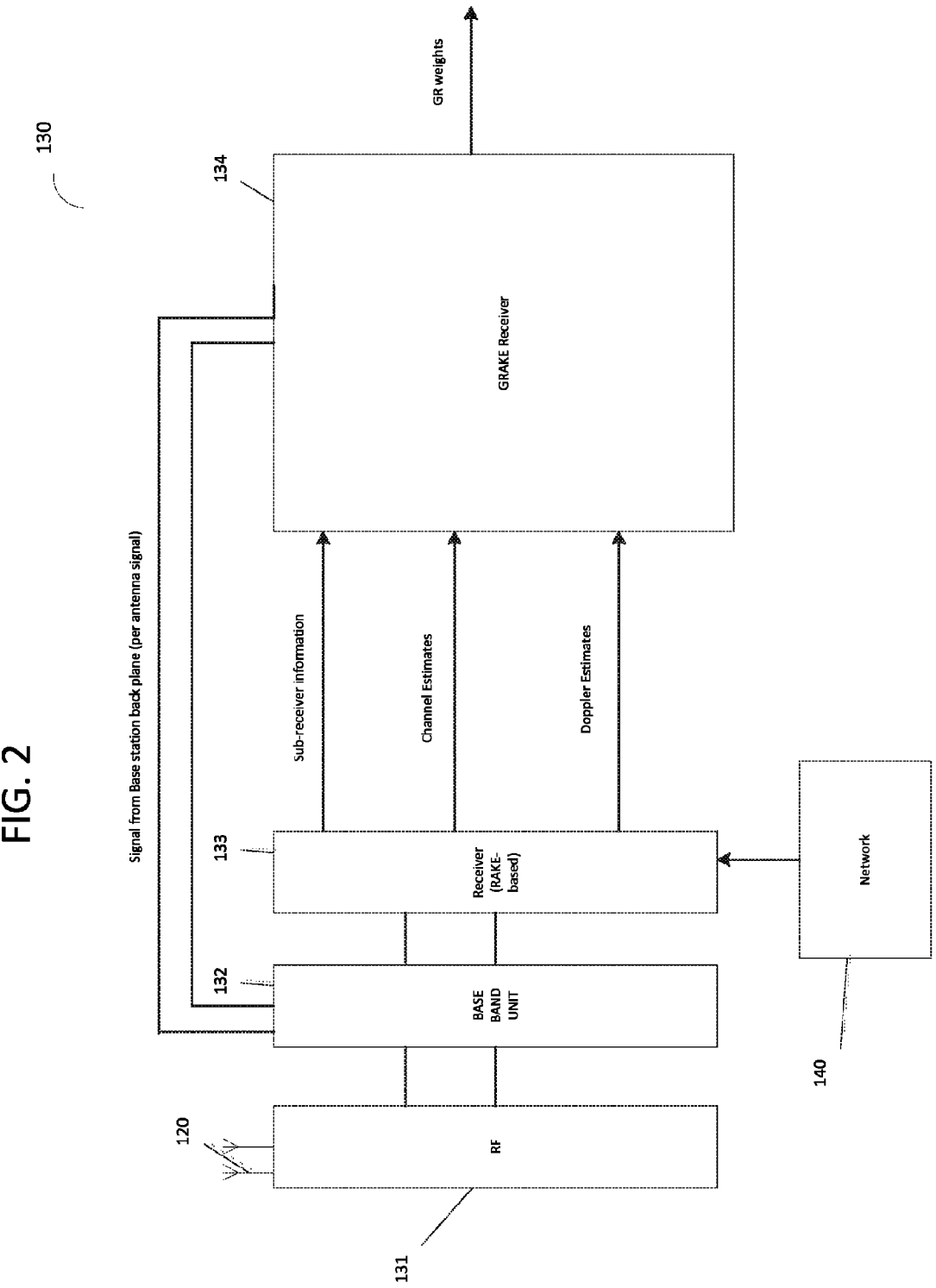
FIG. 2 illustrates the details of a base station according to an embodiment.

FIG. 2 illustrates the details of the base station 130 according to an embodiment.

Referring to FIG. 2, the base station 130 includes the one or more antennas 120, a radio-frequency (RF) unit 131, a base band unit 132, a RAKE receiver 133, and a general-RAKE (GRAKE) receiver 134. A RAKE receiver is a type of radio receiver designed to counter the effects of multipath fading. For example, the RAKE receiver 133 includes a number of "sub-receivers" (e.g., called fingers), each assigned to a different multipath component. Each sub-receiver or finger independently decodes a single multipath component. The RAKE receiver 133 may be constructed using well-known methods.

A GRAKE receiver is similar to the RAKE receiver. For example, in at least one example embodiment, the GRAKE receiver includes a number of sub-receivers, or "fingers," each sub-receiver assigned to a different multipath component. However, the GRAKE receiver additionally implements a (i) finger placement algorithm (e.g., $L_0$ RAKE to L GRAKE fingers) and (ii) a linear minimum mean square error (LMMSE) solution that may reduce the effect of a dispersive channel. For example, the GRAKE receiver may partially restore the lost orthogonality between the spreading codes from the desired base station. The GRAKE receiver may "whiten" interfering signals from other sources (e.g., neighboring cells, other systems, receiver filtering). The finger placement algorithm and the LMMSE solution may be implemented according to known methods. The GRAKE receiver 134 is further explained with reference to FIG. 3.

The RF unit 131 receives the signal from the user equipment 110 via the antenna 120. The RF unit 130 extracts and down-converts the received signal in a known manner. The base band unit 132 converts the signal outputted from the RF unit 131 into a baseband signal in a well-known manner.

The RAKE receiver 133 obtains sub-receiver information or "finger" information. The sub-receiver information includes information indicating a number of sub-receivers ("fingers") and positional information indicating the position of the sub-receivers. The positional information may include sub-receiver offsets. The sub-receiver offsets include information indicating a time delay measured in fractions of chip duration. For example, the sub-receiver offsets may be information indicating a delay span of the RAKE sub-receivers measured in units of chips (e.g., L=delay span of RAKE sub-receivers in chips). If multiple antennas are utilized, the sub-receiver information may include information indicating antenna source identification numbers for the antennas 120 that received the signal.

The RAKE receiver 133 additionally receives network messages from the network 140 via base station 130 (shown in FIG. 1). The network messages include information indicating the spreading factors (e.g., orthogonal variable spreading factor (OVSF)) and scrambling codes (SV). Based on the received spreading factors and scrambling codes, the RAKE receiver 133 computes the channel estimates and the Doppler estimates.

The RAKE receiver 133 determines the channel estimates and Doppler estimates according to any type of known channel estimation method. The RAKE receiver 133 sends the sub-receiver information, the channel estimates and the Doppler estimates to the GRAKE receiver 134 for further processing.

Figure 3:
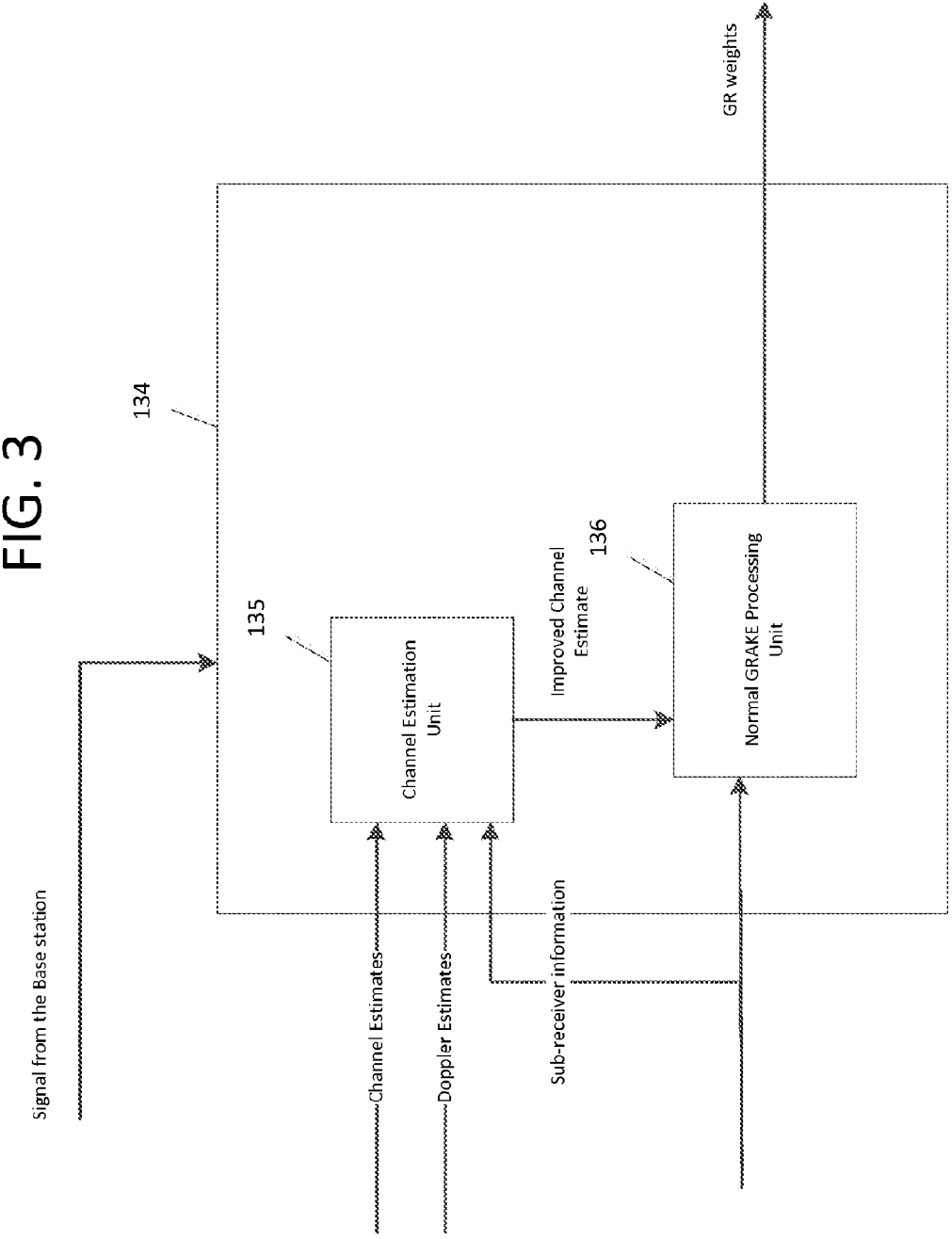
FIG. 3 illustrates a GRAKE receiver according to an embodiment.

FIG. 3 illustrates the GRAKE receiver 134 according to an example embodiment. The GRAKE receiver 134 obtains information indicating a delay span of the GRAKE sub-receivers (e.g., E=delay span of the GRAKE fingers) based on the received sub-receiver information from the RAKE receiver 133. For example, the GRAKE receiver 134 may compute the delay span using a finger location algorithm that determines how to place the E GRAKE finger using a priori knowledge of the L RAKE finger positions. As indicated above, the finger location algorithm may be implemented according to methods that are well known. The GRAKE receiver 134 retrieves the baseband signal from the baseband unit 132, the sub-receiver information from the RAKE receiver 133 and the GRAKE receiver 134, and the channel estimates and the Doppler estimates from the RAKE receiver 133. The GRAKE receiver 134 uses this information to compute the GRAKE (GR) weights to be applied to the outgoing signal.

The GRAKE receiver 134 includes a channel estimation unit 135 and a normal GRAKE processing unit 136. The RAKE receiver 133 and the GRAKE receiver 134 each include one or more processors for performing their respective functions. The channel estimation unit 135 and the normal GRAKE processing unit 136 execute on the one or more processors.

According to an embodiment, the channel estimation unit 135 computes an improved channel estimate. The improved channel estimate improves on the original channel estimates determined in the RAKE receiver 133. The normal GRAKE processing unit 136 computes the GR weights using the improved channel estimate in a known manner. In an embodiment, to compute the improved channel estimate, the channel estimation unit 135 may take into account the difference between a slot value computed by the RAKE receiver 133 and a slot value computed in the normal GRAKE processing unit 136 in order to provide a more accurate channel estimate. This slot difference may be any type of value. In addition, in at least one embodiment, the slot difference may be measured or estimated in real-time by the base station 130.

The channel estimation unit 135 may obtain a slot delay from an internal memory, which stores the slot delay as a fixed value. Alternatively, the slot delay may be obtained based on an estimation process performed by the base station 130. A slot may be defined by the 3GPP physical layer specification 25.211 for the DPCCH channel. For example, a slot may be defined such that there are 15 slots per frame. The slot delay is the numerical difference between the slot number when the channel estimate was computed in the RAKE receiver 133 and the slot number when the weights were computed in the normal GRAKE processing unit 136.

The channel estimation unit 135 predicts the improved channel estimation unit based on the slot delay, the Doppler estimates, and the original channel estimates.

Figure 4:
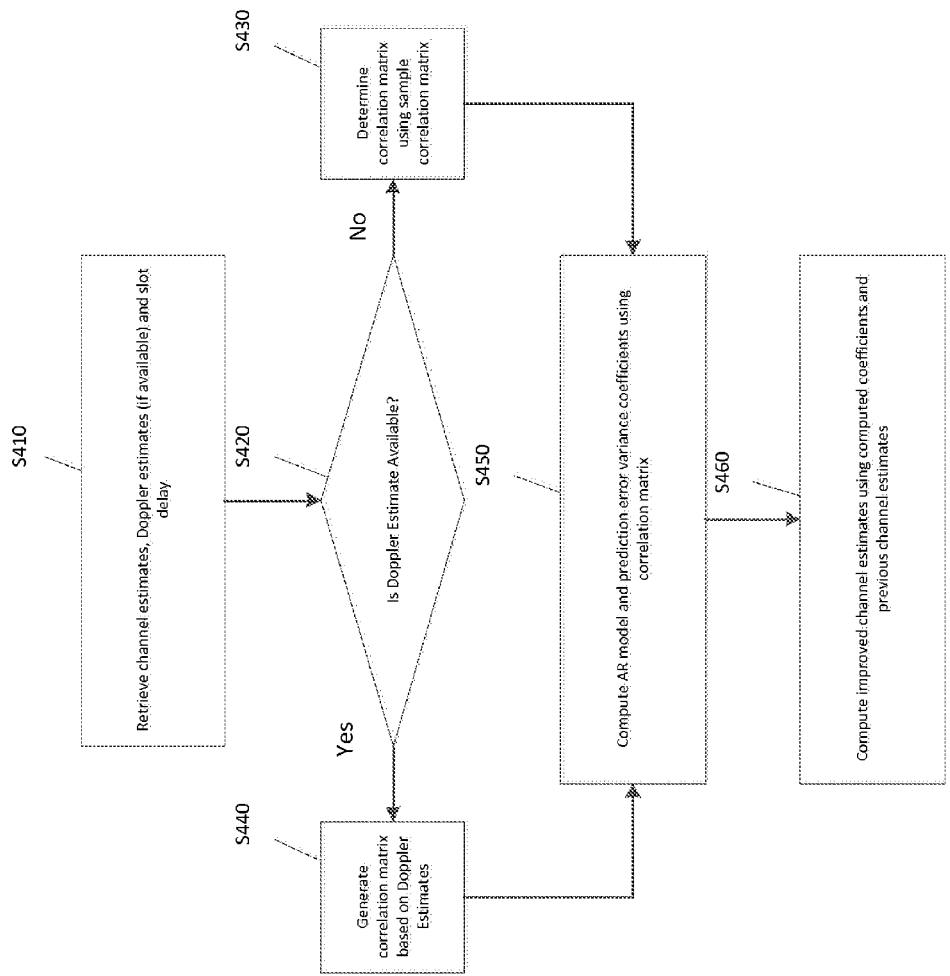
FIG. 4 illustrates a method for determining an improved channel estimate according to an embodiment.

FIG. 4 illustrates a method for determining an improved channel estimate according to an embodiment.

In step S410, the channel estimation unit 135 retrieves the original channel estimates and the Doppler estimates that were computed in the RAKE receiver 133. However, embodiments of the present application encompass the situation where Doppler estimates are not computed in the RAKE receiver 133. As such, the channel estimation unit 135 may retrieve the original channel estimates without obtaining the Doppler estimates. Further, the channel estimation unit 135 retrieves the slot delay information as previously described.

In step S420, the channel estimation unit 135 determines whether the Doppler estimates are available from the RAKE receiver 133. If the Doppler estimates are available, in step S440, the channel estimation unit 135 generates a correlation matrix based on the Doppler estimates. However, if the Doppler estimates are not available, in step S430, the channel estimation unit 135 generates the correlation matrix using a sample correlation matrix.

Given the channel $h_n$ at discrete time n with L-channel taps (i.e. $h_n=[h_{n,L-1}, h_{n,L-2}, \ldots, h_{n,0}]$), the correlation matrix of the l-th channel tap $R_{hh,l}$ may be represented as follows:

Eq. (1)

$$R_{hh,l} = \begin{bmatrix} R_{hh,l}[0] & R_{hh,l}[1] & \ldots & R_{hh,l}[p] \\ R_{hh,l}[-1] & R_{hh,l}[0] & \ldots & \ldots \\ \ldots & & & \\ R_{hh,l}[-p] & R_{hh,l}[-p+1] & \ldots & R_{hh,l}[0] \end{bmatrix} \quad (1)$$

Where:
$R_{hh,l}[k]$ are elements of Matrix $R_{hh,l}$;
$R_{hh,l}[k]=E[h_{n,l}h^*_{n-kN,l}]$, where
N=lags by which the channel vectors are separated N, 2N, ..., MN (slot rate). lag N
and E[.] is the expected value
l=1, ..., L channel taps, i.e., GRAKE fingers;
p=order of the FIR filter taps (or autoregressive (AR) process); and
hh represent k=0, ... p.

If the Doppler estimates are available, and assuming the signal has experienced Rayleigh fading, the channel estimation unit 135 computes the correlation matrix elements of equation 1 using the following autocorrelation equation:

Eq. (2)

$$E[h_{q,i}h^*_{m,j}] = \begin{cases} J_0(2\pi f_d T_s|q-m|), & i = j \\ 0 & i \neq j \end{cases} \quad (2)$$

Becomes:

$$E[h_{q,i}h^*_{m,j}] = \begin{cases} \text{sinc}(2\pi f_d T_s|q-m|), & i = j \\ 0 & i \neq j \end{cases}$$

where: h is a time-variant channel estimate such that $h_{q,i}$ and $h_{m,j}$ are time-variant channel samples of the q-th and m-th lags;
E[.] the expected value;
Ts is sample period;
Ts|q−m| is the lag between two symbols;
fd is a maximum Doppler shift. It is assumed that each channel tap fades independently, and that the maximum Doppler shifts on channel taps are the same. (i,j represents the same channel taps).

and $J_o$ is the zeroth-order Bessel function of the first kind where the unit-variance (normalized) autocorrelation function of a Rayleigh faded channel with motion at a constant velocity is a zeroth-order Bessel function of the first kind.

If the Doppler estimates are not available, the channel estimation unit 135 computes the correlation matrix by approximating the sample correlation matrix that uses the available channel estimates from the previous frames.

After the correlation matrix is computed, the channel estimation unit 135 computes autoregression (AR) coefficients using the correlation matrix with a Yule-Walker Equation. The AR coefficients may be first coefficients $\{A_i\}_{i=1}^P$ and second coefficients $\sigma_p^2$ (prediction error). The channel estimation unit 135 solves for these AR coefficients using the following equations:

Eq. (3)

$$R_{hh,l} a_l = \sigma_p^2 U, \quad (3)$$

where:
l=0, 1, 2, ..., L−1,
U=transposed unit vector: $U=[1\ 0\ 0\ \ldots\ 0]^T$;
L=channel taps i.e. GRAKE fingers; and
$a_l$ is the l-th channel tap AR model coefficient.

Eq. (4)

$$a_l = [1 a_{1,l} a_{2,l} \ldots a_{p,l}], \quad (4)$$

where:
$U=[1\ 0\ 0\ \ldots\ 0]^T$;
p=order of the filter taps; and
T=Transpose of the unit vector.

Eq. (5)

$$r_l = [R_{hh,l}[0] R_{hh,l}[1] \ldots R_{hh,l}[p]],$$

where: $r_l$ is the l-th channel tap, channel estimate correlation vector. (see equation (1)).

Eq. (6)

$$a = [a_{L-1}^T a_{L-2}^T a_{L-3}^T \ldots a_0^T], \quad (6)$$

where:
Matrix "a" represents L-channel taps; and
L=columns of matrix "a", each value in matrix "a" is a transposed vector of size p.

Eq. (7)

$$r = [r_{L-1} r_{L-2} \ldots r_0], \quad (7)$$

where:
matrix "r" represent for L-channel taps, and
$r_{L-1}$ is the L−1-th channel tap, channel estimate correlation vector. (see Equation (1) & (5)).

Eq. (8)

$$\sigma_p^2 = \frac{1}{L}[r_{L-1}\ r_{L-2}\ \ldots\ r_0]a \quad (8)$$

$$r_{hh,l} = \lfloor R_{hh,l}[0]\ R_{hh,l}[1]\ \ldots\ R_{hh,l}[p] \rfloor \text{ and}$$

Eq. (9)

$$a = [a_{L-1}^T\ a_1^T\ a_0^T]^T \quad (9)$$

For large filter taps p and bandlimited channel noise the prediction error variance $\sigma_p^2 \to 0$ and the term will be neglected, where $\sigma_p^2 \sim k \sin c(2\pi f_d T_s)^{2p}$.

After the first AR model coefficients $\{A_i\}_{i=1}^P$ and second coefficients prediction error variance $\sigma_p^2$ are determined, in step S460, the channel estimation unit 135 computes the improved channel estimates based on the first AR model coefficients $\{A_i\}_{i=1}^P$ and second prediction error variance coefficients $\sigma_p^2$ and the original channel estimates. For example, the channel estimation unit 135 computes the improved predicted channel estimates based on the following equation:

$$\hat{h}_n = -\sum_{i=1}^{p} A_i \hat{h}_{n-iN} \quad n = N, \qquad \text{Eq. (10)}$$

2N, ..., MN for every time slot.

Furthermore, the predicted channel estimates $\hat{h}_n$ are computed at intervals of time N, 2N, ..., MN (slot rate).

Referring back to FIG. 3, the normal GRAKE processing unit 136 receives the improved channel estimates from the channel estimation unit 135 and sub-receiver information from the RAKE receiver 133, and computes the GR weights according to methods that are well known.

Variations of the example embodiments are not to be regarded as a departure from the spirit and scope of the example embodiments, and all such variations as would be apparent to one skilled in the art are intended to be included within the scope of this disclosure.

What is claimed:

1. An apparatus for channel estimation, comprising:
a first receiver configured to obtain a first channel estimate of channel conditions associated with a communication channel between the apparatus and a user equipment; and
a second receiver including,
a channel estimation unit configured to compute a second channel estimate of channel conditions associated with the communication channel based on at least the first channel estimate and
a receiver processing unit configured to,
compute weights based on the second channel estimate, the channel estimation unit further configured to obtain a delay between the obtaining of the first channel estimate and the computing of the weights, and
adjust the second channel estimate based on the delay.

2. The apparatus of claim 1, wherein the first receiver is a RAKE receiver and the second receiver is a GRAKE receiver.

3. The apparatus of claim 1, wherein
the first receiver is configured to obtain a Doppler estimate, and
the channel estimation unit is configured to compute the second channel estimate using the delay, the first channel estimate, and the Doppler estimate.

4. The apparatus of claim 3, wherein
the first receiver and the second receiver each include a number of sub-receivers, and the first and second receivers obtain sub-receiver information indicating positional information of the sub-receivers, and
the channel estimation unit is configured to compute the second channel estimate based on the delay, the first channel estimate, the Doppler estimate and the sub-receiver information.

5. The apparatus of claim 1, wherein
the channel estimation unit determines whether Doppler estimates are available from the first receiver,
the channel estimation unit generates a correlation matrix based on the Doppler estimates if the Doppler estimates are available from the first receiver, and
the channel estimation unit computes the second channel estimate using the correlation matrix.

6. The apparatus of claim 5, wherein
the channel estimation unit generates a sample correlation matrix if the Doppler estimates are not available from the first receiver, and the channel estimation unit computes the second channel estimate using the correlation matrix.

7. The apparatus of claim 6, wherein
the channel estimation unit computes coefficients using the correlation matrix or the sample correlation matrix, and
the channel estimation unit computes the second channel estimate based on the computed coefficients and the first channel estimate.

8. A method for channel estimation, comprising:
obtaining, by a channel estimation apparatus, a first channel estimate associated with a communication channel between a base station and a user equipment;
computing, by the channel estimation apparatus,
a second channel estimate associated with the communication based on at least the first channel estimate, and
weights based on second channel estimate;
obtaining, by the channel estimation apparatus, a delay between the obtaining and the computing of the weights; and
adjusting the second channel estimate based on the delay.

9. The method of claim 8, further comprising:
obtaining, by a first receiver of the channel estimation apparatus, a Doppler estimate,
wherein the computing computes the second channel estimate using the delay, the first channel estimate, and the Doppler estimate.

10. The method of claim 9, further comprising:
obtaining, by the first and a second receiver of the channel estimation apparatus, sub-receiver information indicating positional information of sub-receivers,
wherein the computing computes the second channel estimate based on the delay, the first channel estimate, the Doppler estimate and the sub-receiver information.

11. The method of claim 8, further comprising:
determining, by a second receiver of the channel estimation apparatus, whether Doppler estimates are available from the first receiver; and
generating, by the second receiver, a correlation matrix based on the Doppler estimates if the Doppler estimates are available from the first receiver,
wherein the computing computes the second channel estimate using the correlation matrix.

12. The method of claim 11, further comprising:
generating, by the second receiver, a sample correlation matrix if the Doppler estimates are not available from the first receiver,
wherein the computing computes the second channel estimate using the correlation matrix.

13. The method of claim 12, further comprising:
computing, by the second receiver, coefficients using the correlation matrix or the sample correlation matrix,
wherein the computing a second channel estimate computes the second channel estimate based on the computed coefficients and the first channel estimate.

14. An apparatus for channel estimation, comprising:
a channel estimation unit configured to receive a first channel estimate associated with a communication channel between the apparatus and a user equipment,
the channel estimation unit configured to obtain a delay between when the first channel estimate was estimated and when weights are computed by a receiver processing unit, the channel estimation unit configured to compute a second channel estimate associated with the communication channel based on the first channel estimate and the delay.

* * * * *